(12) United States Patent
Nweke

(10) Patent No.: US 7,578,911 B2
(45) Date of Patent: Aug. 25, 2009

(54) HYDROGEN INJECTION POWERED AUTOMOBILE ENGINE

(76) Inventor: Christian Osita Nweke, P.O. Box 1304, Alief, TX (US) 77411

( * ) Notice: Subject to any disclaimer, the term of this patent is extended or adjusted under 35 U.S.C. 154(b) by 0 days.

(21) Appl. No.: 10/100,489

(22) Filed: Jun. 11, 2002

(65) Prior Publication Data

US 2002/0170820 A1      Nov. 21, 2002

(51) Int. Cl.
*F02B 43/10*      (2006.01)
*F02B 43/08*      (2006.01)
*C25B 1/04*       (2006.01)

(52) U.S. Cl. ............... 204/266; 123/3; 123/DIG. 12

(58) Field of Classification Search ......... 205/628, 205/633, 637; 123/536, 537; 60/39.19, 597; 429/13, 14, 17
See application file for complete search history.

(56) References Cited

U.S. PATENT DOCUMENTS 3,608,660 A * 9/1971 Smith et al. ............. 180/69.5
5,119,768 A * 6/1992 Russell ..................... 123/1 A
6,155,212 A * 12/2000 McAlister .................. 123/3
6,257,175 B1 * 7/2001 Mosher et al. ............. 123/3
6,314,732 B1 * 11/2001 Lookholder ................ 60/597

FOREIGN PATENT DOCUMENTS

JP          10-176796 A  *  6/1998

OTHER PUBLICATIONS

Zumdahl, Steven, "Hydrogen as a Fuel" from Chemistry, $3^{rd}$ edition, 1993 (no month) pp. 263-267.*

* cited by examiner

*Primary Examiner*—Harry D Wilkins, III
(74) *Attorney, Agent, or Firm*—Delphine James

(57) ABSTRACT

This invention seeks an alternative source of fueling technology to obtain power for an auto engine, by combining technology and chemical electrolysis of water. The major component would be using an apparatus as a device called electrolysis, a device that can break up water molecules into hydrogen and oxygen. Hydrogen being used as the source of energy or fuel, while the end product water vapor would be recycled to combined with oxygen and atmospheric air to re-form water. This water would be recycled to be re-used.

14 Claims, 4 Drawing Sheets

ELECTROLYSIS DEVICE

CONVERTER

CONECTING PIPE

HYDROGEN INJECTION POWERED AUTOMOBILE ENGINE

BACKGROUND

SUMMARY

This a continuation of application Ser. No. 10/100,489.

In summary this invention has ten recognizable advantages which out weighed the present invention. (1) The present automobile pollutants which is hydrocarbons, carbon monoxide, carbon dioxide, which deplete our ozone layer is totally eliminated. (2) Water is not a pollutant and by venture of its nature of the water cycle will continue to exist forever. (3) By using water molecule which is hydrogen, automobiles could be powered and by recycling the end product which is hydrogen dioxide to mix with oxygen and atmospheric air, water is obtained. (4) If perhaps there would be a run off of excess water via the overflow pipe, that, is not a pollutant and returns to the water cycle. (5) Reduced operational cost, water is available at reduced cost.

(6) Recycled water does not permit constant addition of water in the tank. (7) The vehicle produces its combustible hydrogen which is the main fuel and so constant fueling is eliminated. (8) Fire risk is reduced as water stations and transporting water has apparently less or no risk. (9) Reduced weight due to re-cycling of water, bulky tanks, may not be necessary. (10) If hydrogen tank is full before the electrolysis device malfunctions, car would be running for days allowing the operator time for maintenance.

The only disadvantage associated with this device is when the hydrogen tank is empty when the electrolysis device has malfunctioned, the car will stall until a new device is installed, this however is not a serious disadvantage considering the advantages which is overwhelming.

BRIEF DESCRIPTION OF DRAWINGS

The details of the invention are described in connection with the accompanying drawings in which.

DETAILED SPECIFICATION

Components

A water tank is provided to store the water for fuel for the engine. The electrolysis unit converts the water to hydrogen and oxygen. A plastic tank re-enforced with steel metal, connecting plastic pipes also re-enforced via hydrogen pump to the injectors. Three non-return valves are components of the system. A water heater is installed into the water tank to maintain it at room temperature. An air pump and a converter are used to convert oxygen to water. A film of water cushion in a plastic tank surrounds the entire hydrogen tank to maintain hydrogen in the tank at room temperature.

Operation

Figure 1:
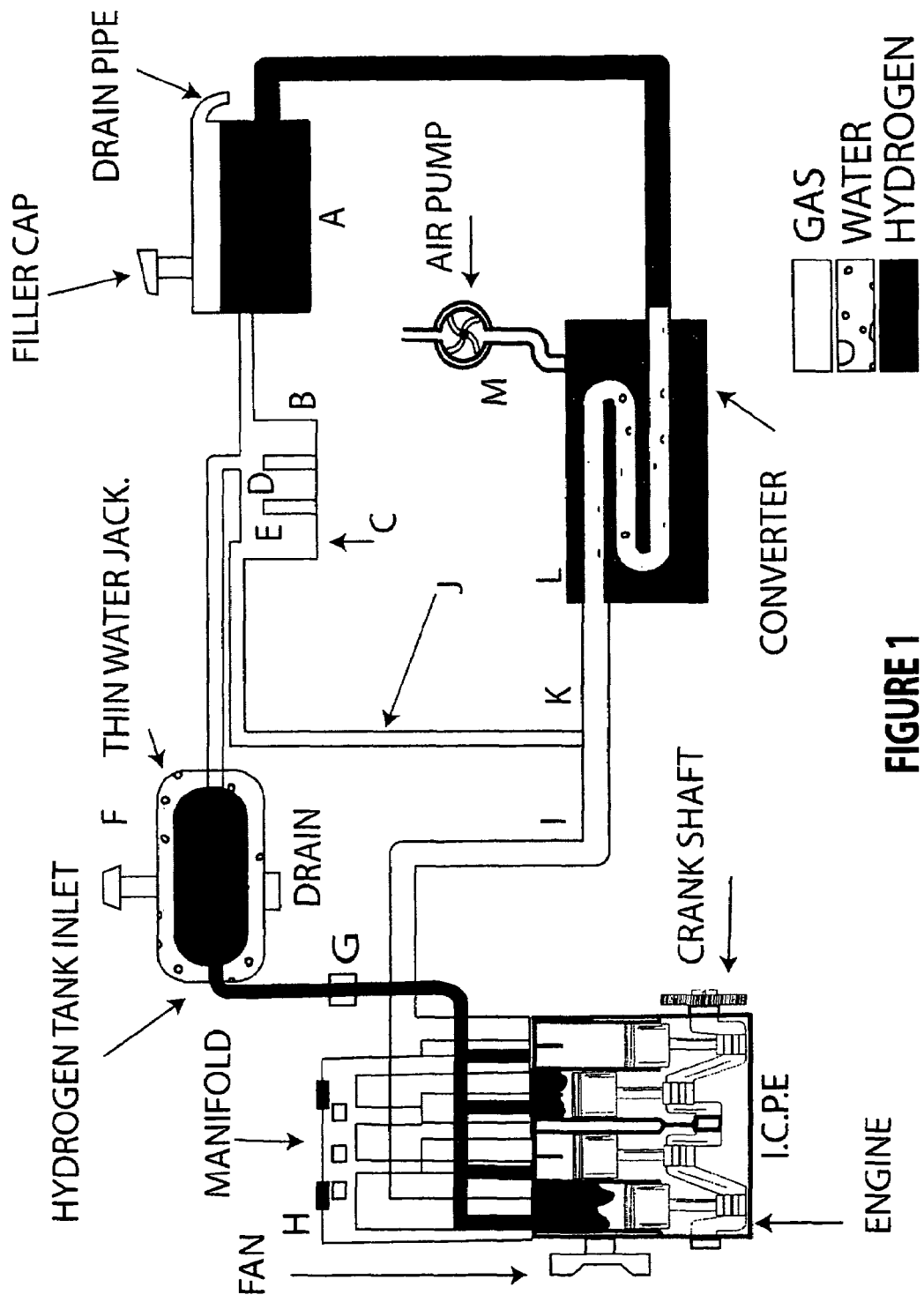
FIG. 1 is an overall perspective view of the present invention.

An alternative fuel- water- is filled in the water tank (A), this leads into the electrolysis device (C) via pipe (B). Two outlet ports (D) and (E) carry hydrogen and oxygen. The hydrogen passes via a non-return valve to a plastic tank (F)—a non absorbent material to hydrogen—to a hydrogen pump (G) and to the injectors 1, 2, 3, and 4. As shown in FIG. 1, each injector is attached to a cylinder of the combustion chamber. The inlet manifold (H) is vented by little holes to the atmosphere. While the exhaust manifold (I) is completely closed and leads hydrogen dioxide to oxygen carrying pipe (J) and exhaust manifold (K) into a converter (L). An air pump (M) blows atmospheric air into the converter.

When water flows from tank to electrolysis device (C), water is exploded into oxygen (−) and hydrogen (+). The hydrogen flows through a non-return valve to a hydrogen tank (F) and the pump (G) sends it to the injectors 1,2,3,4, See FIG. 1 in the diagram. See also device mounting arrangement on the vehicle FIG. 2.

Induction

Figure 7:
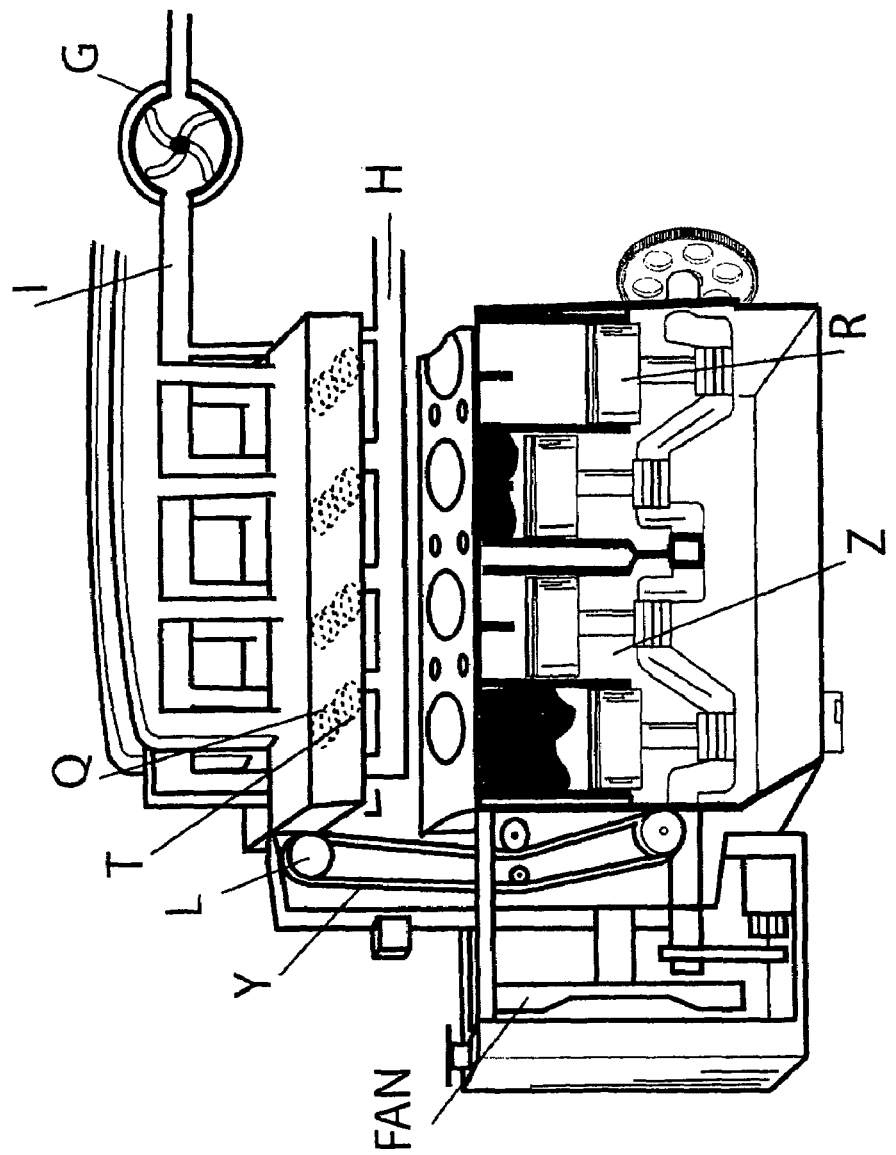
FIG. 7 illustrated an exploded cross-sectional view of the combustion chamber.

Referring to FIG. 7, there is shown an exploded cross-sectional view of the automobile engine. As the piston descends on the induction stroke, air from the atmosphere is sucked into each combustion chamber (Z) through the inlet valve (T). The inlet valve (T) is mounted upon each combustion chamber (Z). The crankshaft (R) is connected to the conventional camshaft (L) by a conventional timing belt (Y) and is timed to open the inlet valve (T) and exhaust valve (U) in relation to the piston cycle in the combustion chamber (Z). As the piston descends, on the induction stroke while the crankshaft (R) is turning suction is created in the combustion chamber (Z) which draws in air from the inlet manifold (H) which leads to the conventional air filter of the engine. The air filter cleans the air from the atmosphere in the conventional engine.

Compression

When the piston ascends on compression stroke, both valves are closed and a high temperature is built up in the compressed air.

Power

As the piston is close to top dead center of the cylinder, hydrogen via the injector nozzle is sprayed into the compressed air according to the firing order. Just after then an accurately timed spark occurs from a spark plug which ignites the hydrogen. Expansion and pressure of gases occurs and the piston descends on a downward stroke. Both valves are closed.

Exhaust

As the piston ascends, the exhaust valve opens and the hydrogen dioxide (HO) enters the exhaust pipe. On reaching the oxygen discharged from the electrolysis device via pipe (J), it becomes water and flows into the converter (L). A blast of air from the air pump (M), compensates for the oxygen that may be required to convert more water vapor to water. This water flows back into the water tank to be re-used. The accurately timed spark is controlled by conventional electronic means utilized in automobiles.

An overflow pipe installed to the water tank allows excess water to flow out to the ground.

Figure 2:
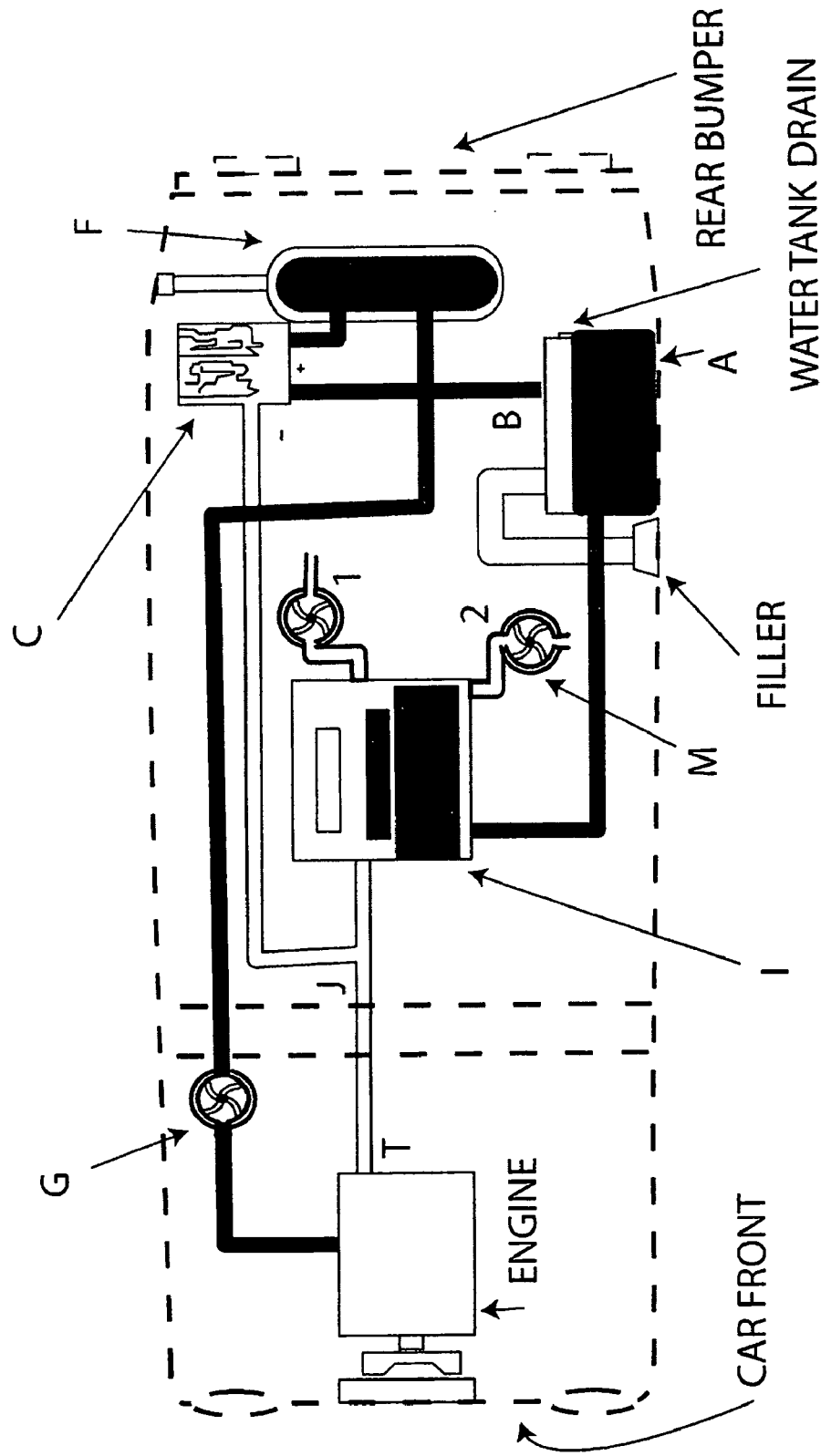
FIG. 2 illustrates how one embodiment of the present invention can be installed in an automobile.
Figure 4:
FIG. 4 is an exploded side view of the electrolysis device
Figure 3:
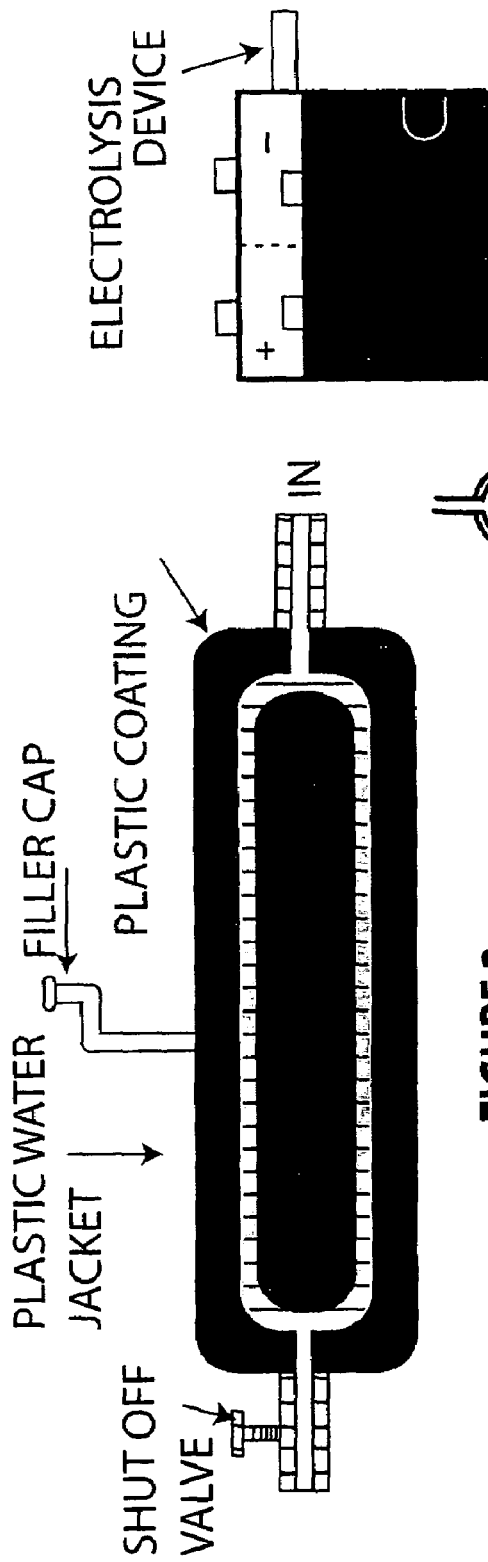
FIG. 3 is an exploded side view of the fuel tank.
Figure 6:
FIG. 6 illustrates an exploded cross-sectional view of the converter mechanism.
Figure 5:
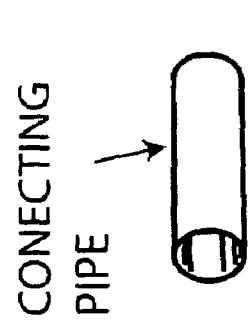
FIG. 5 illustrates an exploded cross-sectional view of the connecting pipe.

As shown in FIG. 2, this invention is an attachment onto an existing automobile. This invention replaces gasoline components with hydrogen components to the an automobile.

What is claimed is:

1. An automobile engine comprising:

a plurality of injectors;

a combustion chamber operably associated with each injector, a plurality of apertures situated above the combustion chamber; a cylinder with an internal piston within the combustion chamber;

a fuel supply means containing water, a means for supplying the water to an electrolysis device;

a means for generating hydrogen gases and oxygen gases from the water utilizing the electrolysis device;

as the piston descends in the cylinder, air is injected into the plurality of apertures;

as the piston ascends, a means for compressing the injected air;

a means for injecting a small amount of the hydrogen gases into the compressed air according to a timed firing order of the fuel injectors;

a means for combusting the injected hydrogen gases and the compressed air according to a timed ignition spark;

a means for generating exhaust gases during combustion wherein the combustion of the automobile engine is powered by water; and a means for converting the exhaust eases combined with the oxygen gases into water and delivering the converted water to the fuel supply means.

2. The automobile engine of claim 1 wherein the means for combusting further comprises an electronic means in communication with the first injection means for controlling the timing of the injection of the hydrogen gases and the timing of the combustion ignition spark.

3. The automobile engine of claim 2 further comprising a pump in communication with the electronic means for delivering the hydrogen gases to the plurality of injectors.

4. The automobile engine of claim 1 further composing a heater operably connected to the fuel supply means for maintaining the temperature of the water.

5. The automobile engine of claim 1 wherein the fuel supply means further comprises a drain pipe for draining the excess water.

6. The automobile engine of claim 1 wherein the fuel supply means further comprises a non-return valve for delivering the water to the electrolysis device.

7. The automobile engine of claim 1 wherein a receptacle in one-way communication with the electrolysis device for receiving and storing the generated hydrogen gas generated by the electrolysis device.

8. The automobile engine of claim 7 wherein the receptacle further comprise a non-return valve for delivering the hydrogen gas to the pump.

9. The automobile engine of claim 7 wherein the receptacle further comprises: an inner tank and an outer tank;

the inner tank for storing the generated hydrogen gas;

the inner tank having smaller dimensions than the tank such that the outer tank encompass the inner tank;

the outer tank-containing a water cushion surrounding the inner tank to absorb the heat and to maintain the inner tank at room temperature.

10. The automobile engine of claim 7 wherein a delivery mechanism is operably associated with the receptacle for delivering the generated hydrogen gas into the plurality of injectors.

11. The automobile engine of claim 7 wherein the receptacle further comprises:

an inner tank and an outer tank;

the inner tank for storing the hydrogen gas;

the inner tank having smaller dimensions than the outer tank such that the outer tank surrounds the inner tank;

the outer water tank containing water forming a water cushion surround the inner tank to absorb the heat and to maintain the inner tank at room temperature.

12. The automobile engine of claim 1 wherein the means for converting further comprises:

a converter pipe member in one way communication with the electrolysis device and combustion chamber for receiving the oxygen gases and the exhaust gases and creating a mixture of the gases: an inlet port for receiving the mixture of gases from the converter pipe member;

a third means for converting the gas mixture into water;

a condenser pump operably associated with the third means for cooling the gas mixture and an outlet port for delivering the water to the fuel supply.

13. The automobile engine of claim 12 further comprising a tank having an internal winding S-shaped channel throughout its dimensions, whereby the mixture of gases traverses from an upper end of the S-Shaped channel to an lower end of S-shaped channel as the mixture of gases is converted.

14. The automobile engine of claim 1 filer comprising an inlet manifold mounted upon the combustion chamber, the inlet manifold having a plurality of apertures for receiving air from the atmosphere in the combustion chamber.

* * * * *